(No Model.) 2 Sheets—Sheet 1.
P. M. KLING.
RAILWAY CAR.
No. 516,935. Patented Mar. 20, 1894.
Fig. I.
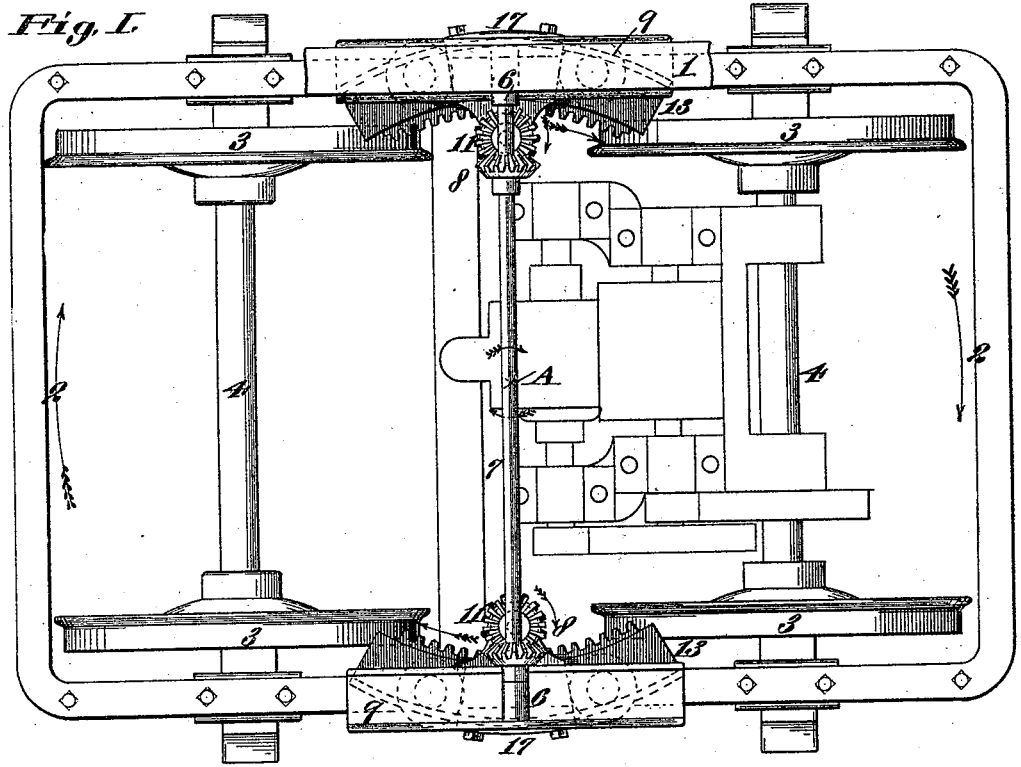
Fig. II.
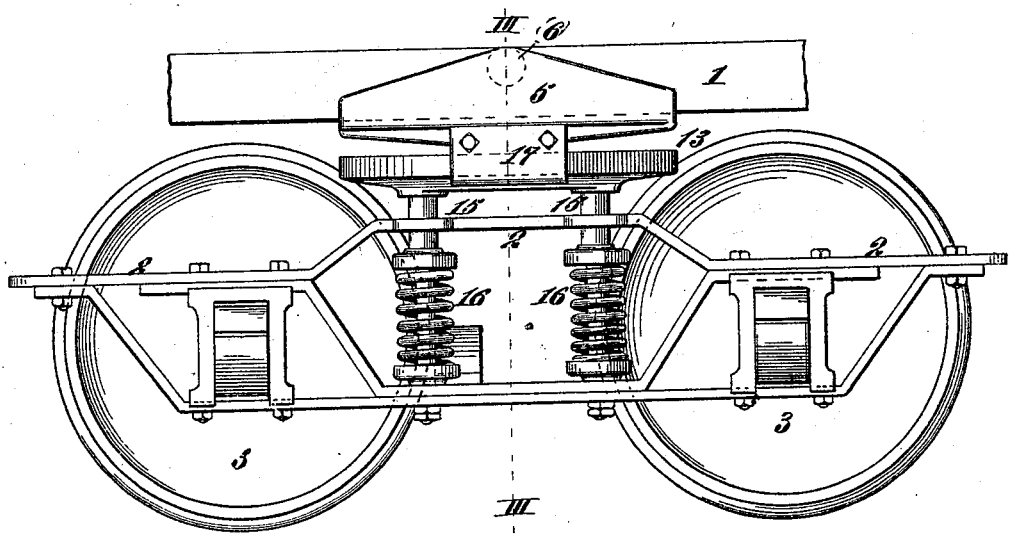
Attest:
A. M. Obersold
C. S. Edwards.
Inventor:
Peter M. Kling
By Knight Bros.
attys

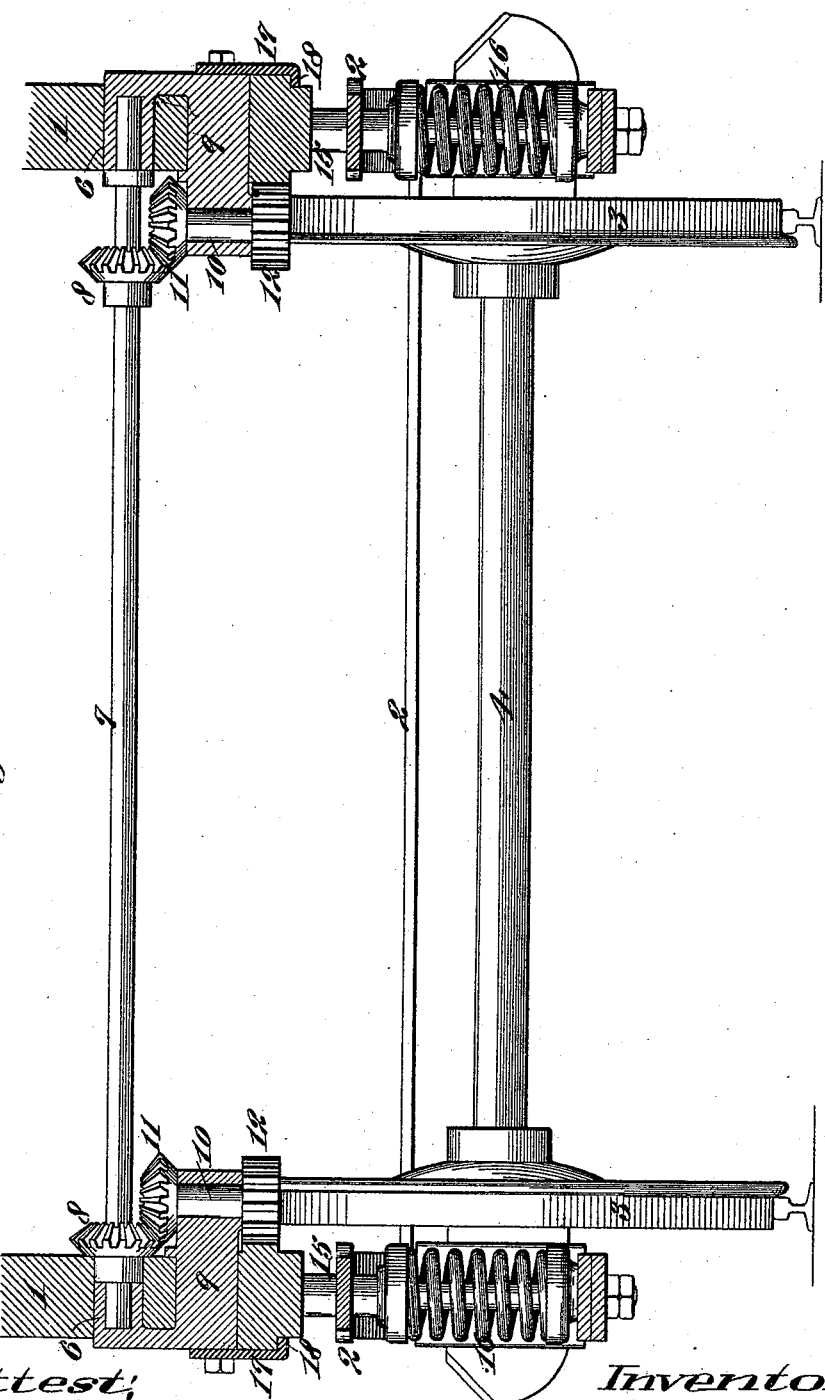

UNITED STATES PATENT OFFICE.

PETER M. KLING, OF ST. LOUIS, MISSOURI.

RAILWAY-CAR.

SPECIFICATION forming part of Letters Patent No. 516,935, dated March 20, 1894.

Application filed December 13, 1893. Serial No. 493,571. (No model.)

*To all whom it may concern:*

Be it known that I, PETER M. KLING, of the city of St. Louis, in the State of Missouri, have invented a certain new and useful Improvement in Railway-Cars, of which the following is a full, clear, and exact description, reference being had to the accompanying drawings, forming part of this specification.

My invention relates to certain improvements in the manner of connecting the trucks to the body of the car, whereby the use of the ordinary bolster is dispensed with, and the car body proportionately lowered, so as to avoid the necessity of high steps.

My invention consists in features of novelty hereinafter fully described and pointed out in the claims.

Figure I is a top view of a truck, and the parts to which my invention relates. Fig. II is a side view. Fig. III is a transverse section, showing part of a car body, and part of the truck, with my improvement applied; the section is taken on line III—III, Fig. II.

Referring to the drawings, 1 represents the sills of a car body, 2 represents the truck frame, 3 the wheels of the truck, and 4 the axles of of the truck. So far as the truck itself is concerned, and so far as the truck frame is concerned, they may be of any ordinary form or construction.

Secured to the sills 1 of the car body is a block or casting 5, having an upper portion 6, which is fitted in an opening in the sill. There is a casting 5 at each side of the car, and each casting has a member 6. The two members 6 receive the ends of a shaft 7 which extends across the car, and which is provided with bevel wheels 8. The castings 5 have lower members or parts 9 that fit beneath the sills 1, and are extended beyond the inner faces of the sills, so as to form journal supports for short vertical shafts 10, having bevel wheels 11 on their upper ends, which engage with the bevel wheels 8 upon the shaft 7, and having pinions 12 on their lower ends.

Secured to each side of the truck frame is a segmental rack 13, with teeth formed on its inner side, the teeth of the segments meshing into or engaging with the pinions 12. I have shown the racks 13 supported on bolts 15, having spring connection 16 with the truck frame, see Fig. II. These racks may, however, be supported in some other way.

The car body is held from vertical movement with relation to the truck, by means of plates 17, bolted to the castings 5, and which have inturned, lower edges 18, engaging beneath the racks 13, as seen in Fig. III. The plates 17 do not interfere with the movement of the racks, as the truck turns relatively to the body of the car, but they keep the body from moving vertically away from the truck.

In the operation of the truck, it turns on the imaginary center A, Fig. I, the bevel wheels 8 and 11, and the racks 13 moving in the direction of the arrows, Fig. I, when the truck swings in one direction, and these parts moving back to their normal position, shown in Fig. I, when the truck comes again into line with the car body. When the truck swings in the other direction, these parts assume the reverse position to that indicated by the arrows, Fig. I, and thus the car truck is held from lateral movement with relation to the body, while it is free to turn about its central axis. The gearing being reversed on the opposite sides of the truck, it is evident that the truck cannot move longitudinally, in a line parallel with the length of the car.

By the use of this invention, I dispense with the necessity of a bolster ordinarily used with pivotal trucks, and lower the car body much nearer the ground than can be done with the use of bolsters.

I claim as my invention—

1. In combination with a car body and truck, a shaft extending across the car body, racks secured to the truck frame, and gearing between said shaft and racks; substantially as set forth.

2. In combination with a car body and truck, a set of gearing connecting the truck frame to the car body on opposite sides of the car, whereby the truck can move about its central axis while being held from lateral and longitudinal movement with relation to the car body; substantially as set forth.

3. In combination with a car body and truck, a casting secured to the car body on each side of the car, a transverse shaft journaled in said casting and provided with bevel wheels, vertical shafts journaled in said castings, and having bevel wheels on their upper ends engaging the first mentioned bevel wheels, and having pinions on their lower ends, and racks secured to the truck frame, and engaging said pinions; substantially as and for the purpose set forth.

4. In combination with a car body and truck, a casting secured to each side of the car body, a transverse shaft journaled in said castings and having bevel wheels secured thereto, vertical shafts journaled in said castings, and having bevel wheels on their upper ends, which engage the first mentioned bevel wheels, and having pinions on their lower ends, racks secured to the truck frame, and engaging said pinions, and plates secured to said castings and engaging said racks; substantially as and for the purpose set forth.

P. M. KLING.

In presence of—
A. M. EBERSOLE,
C. G. EDUARDS.